United States Patent [19]
Orlamünder et al.

[11] Patent Number: 5,926,536
[45] Date of Patent: Jul. 20, 1999

[54] METHOD OF ESTABLISHING A CONNECTION AS WELL AS AN EXCHANGE, SERVICE COMPUTER AND COMMUNICATIONS NETWORK

[75] Inventors: Harald Orlamünder, Ditzingen; Uwe Stahl, Leonberg, both of Germany

[73] Assignee: Alcatel Alsthom Compagnie Generale d'Electricite, Paris, France

[21] Appl. No.: 08/861,665

[22] Filed: May 22, 1997

[51] Int. Cl.$^6$ ....................................... H04M 7/00
[52] U.S. Cl. ........................... 379/221; 379/219; 379/211
[58] Field of Search .................................... 379/207, 209, 379/219, 220, 221, 229, 230, 211, 210, 202

[56] References Cited

U.S. PATENT DOCUMENTS

| 5,490,212 | 2/1996 | Lautenschlager | 379/221 X |
| 5,705,998 | 1/1998 | Stampfl | 379/221 X |
| 5,784,450 | 7/1998 | Stahl | 379/220 X |

FOREIGN PATENT DOCUMENTS

| 0559979 | 9/1993 | European Pat. Off. . |
| 3921637 | 2/1995 | Germany . |
| 19523290 | 1/1996 | Germany . |

OTHER PUBLICATIONS

"Vernetzte TK–Anlagen ohne Grenzen", H. Dehlen, ntz, vol. 45 (1992), No. 9, pp. 714–720, No Translation.

*Primary Examiner*—Creighton Smith
*Attorney, Agent, or Firm*—Ware, Fressola, Van Der Sluys & Adolphson LLP

[57] ABSTRACT

A requesting terminal signals a call request (CALL) to a control unit of a first communications network. The control unit then determines whether sufficient capacity is available in the first communications network to establish the connection requested by the call request. In the event of insufficient capacity, the control unit transmits an overload message (DAT) to the requesting terminal. It only initiates an alternative establishment of the requested connection via another, second communications network after it receives an acknowledge message (ACK) issued by the requesting terminal.

9 Claims, 2 Drawing Sheets

METHOD OF ESTABLISHING A CONNECTION AS WELL AS AN EXCHANGE, SERVICE COMPUTER AND COMMUNICATIONS NETWORK

BACKGROUND OF THE INVENTION

1. Technical Field of the Invention

The invention concerns a method of establishing a connection, an exchange of a communications network, a service computer for one or more communications networks, and a communications network.

2. Description of Related Art

Strategies for establishing connections under overload conditions of a communications network are known above all from the field of private communications.

The invention starts with a conventional generic method of establishing a connection, such as is used in private branch exchange networks, for example in company networks which have several network accesses to a public telephone network. This method is described for example in the article "Cross-linked TX installations without boundaries" by Hilmar Dehlen, ntz, Volume 45 (1992) on pages 714 to 720 of Brochure 9.

The private communications network is formed of several private branch exchange switching units which are intermeshed by groups of transverse line. Each individual private branch exchange switching unit has access to the public telephone network. If a private branch exchange switching unit receives a call request for a connection to a terminal of another private branch exchange switching unit in the private network, and if a bottleneck in the private network delays the establishment of the requested connection via the private network, an automatic overflow into the public telephone network takes place, i.e. the private branch exchange switching unit reroutes the call request to the public telephone network, thereby establishing a connection to the requested terminal via the public telephone network.

This method of establishing a connection has the disadvantage that considerable costs are incurred by using the public telephone network in the case of an overload, and that there is no possibility of achieving a more uniform utilization of the private communications network.

SUMMARY OF THE INVENTION

The task of the invention is to offer a method of establishing a connection for an overloaded network which allows optimization of routing guidance cost and traffic in case of an overload.

According to a first aspect of the present invention, a method of establishing a connection wherein a requesting terminal signals a call request to a control unit of a first communications network, and wherein the control unit determines whether sufficient capacity is available in the first communications network for establishing the connection requested by the call request, is characterized in that in an absence of sufficient capacity, the control unit sends an overload message to the requesting terminal, and initiates an alternative establishment of the requested connection through another, second communications network only upon reception of an acknowledge message from the requesting terminal.

According to a second aspect of the present invention, an exchange of a first communications network, comprising means for transmitting messages to and receiving messages including a call request from a requesting terminal, and a control unit for determining whether sufficient capacity is available in the first communications network for establishing a requested connection in response to the call request, is characterized in that the control unit initiates a transmission of an overload message to the requesting terminal if insufficient capacity is determined, and initiates an alternative establishment of the requested connection through another, second communications network only upon reception of an acknowledge message from the requesting terminal.

According to a third aspect of the invention, a service computer for a first communications network or for two or more communications networks, comprising means for transmitting messages to and receiving messages including a call request from a requesting terminal, and a control unit for determining whether sufficient capacity is available in the first communications network or in a first of the two or more communications networks for establishing a requested connection in response to the call request, is characterized in that the control unit initiates a transmission of an overload message to the requesting terminal if insufficient capacity is determined, and initiates an alternative establishment of the requested connection through another, second communications network only upon reception of an acknowledge message from the requesting terminal.

According to a fourth aspect of the invention, a communications network for establishing a connection in response to a requesting terminal of the communications network signaling a call request to a control unit of the communications network for determining whether sufficient capacity is available in the communications network for establishing the connection requested by the call request, wherein in an absence of sufficient capacity, the control unit sends an overload message to the requesting terminal and initiates an alternative establishment of the requested connection through another communications network only upon receipt of an acknowledge message from the requesting terminal.

The invention is based on the idea of advising the requesting subscriber of the overload during an overload situation, and after receiving an acknowledge message from the requesting subscriber to reroute the call request to another network, thereby establishing the requested connection via the other network. This results in the advantage that in the case of an overload an individual decision about the connection is made possible, which influences the subscriber's response in the overload case and thereby leads to a more uniform utilization of the network and a reduction of the costs.

If the requesting subscriber does not send an acknowledge message, it is advantageous to send a release message to the requesting terminal when sufficient available capacity is again determined in the communications network. This makes it possible to further influence the subscriber's response in regard to a cost optimization.

In this case not only can the invention be used in a communications environment with a private and a public telephone network; it can rather be used in any heterogeneous network environment with several private and/or public communications networks, or virtual communications networks. In this way it fulfills particular requests for the establishment of a connection which originate from a deregulated heterogeneous communications environment.

These and other objects, features and advantages of the present invention will become more apparent in light of the detailed description of a best mode embodiment thereof, as illustrated in the accompanying drawing.

BRIEF DESCRIPTION OF THE DRAWING

The invention is explained in the following by means of two configuration examples with the help of the attached drawings, where.

DETAILED DESCRIPTION OF THE PREFERRED EMBODIMENTS

The first configuration example explains the establishment of a connection according to the invention in a communications network according to the invention, which is equipped with an exchange according to the invention.

Figure 1:
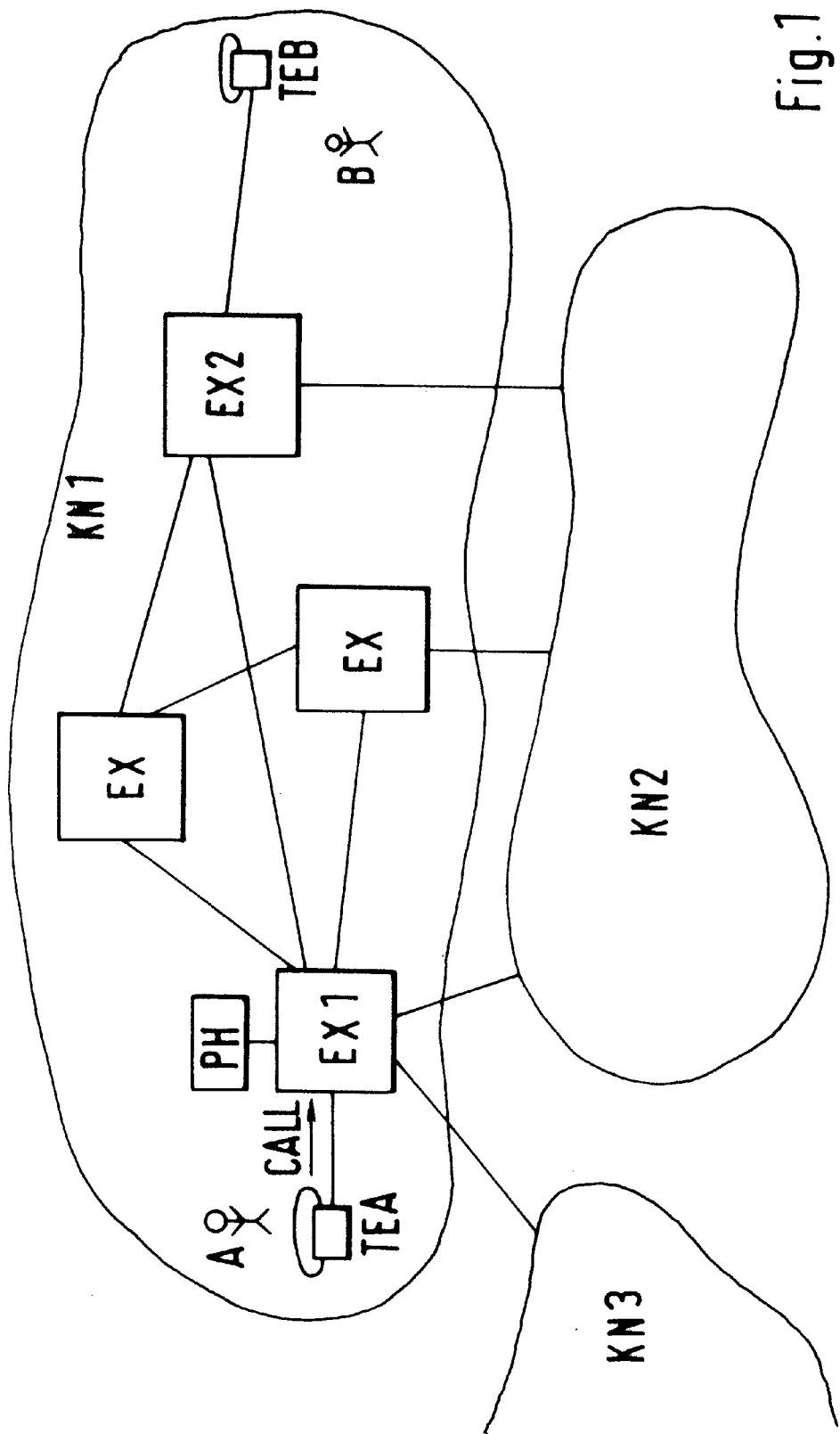
FIG. 1 is a block circuit diagram of a communications environment with a communications network according to the invention.

FIG. 1 illustrates three communications networks KN1 to KN3 which are interconnected.

The communications networks KN2 and KN3 are public communications networks of two different network operators. The communications network KN1 is a private communications network. However it is also possible for the communications network KN1 to be a public communications network of a third network operator. The communications networks KN2 and KN3 could be two different private communications networks.

The communications network KN1 contains several exchanges EX, EX1 and EX2 and two terminals TEA and TEB which are assigned to a subscriber A or to a subscriber B. The terminals TEA and TEB are connected to the exchanges EX1 or EX2. The exchanges EX1 and EX2 are interconnected via several exchanges EX. Exchange EX1 is connected by means of network accesses to the communications networks XN2 or KN3. Exchange EX2 is connected to the communications network KN2.

The terminals TEA and TEB are conventional telephone terminals, for example telephones, faxes or data processing units equipped with a modem or with a corresponding interface board. They can be analog or digital (ISDN= Integrated Services Digital Network) terminals.

The exchange units EX, EX1 and EX2 are conventional telephone exchanges, preferably private branch exchange switching units. Said exchanges are intermeshed by physical connecting lines of the communications network KN1, or by physical connecting lines which are leased by one of the communications networks KN2 and KN3. It is also possible for the communications network KN1 to be a virtual communications network in which the exchange units EX, EX1 and EX2 are partially interconnected via dial lines of communications networks KN2 and KN3.

Of the exchange units in communications network KN1, the exchange unit EX1 has a special design. It has several peripheral components PH whereby it can transmit voice messages or display text to its connected terminal (of these only terminal TEA is illustrated as an example in FIG. 1). The exchange EX1 therefore may include means for receiving a call request CALL from a requesting terminal TEA, means for transmitting messages to and receiving messages from the requesting terminal TEA, and a control unit, which is provided with means for determining whether sufficient capacity is available in the first communication network KN1 for establishing the connection requested by the call request CALL. More particularly, the control unit is designed to initiate the transmission of an overload message DAT (see FIG. 2) to the requesting terminal TEA if insufficient capacity is determined, and to initiate an alternative establishment of the requested connection through another, second communications network KN2 only upon reception of an acknowledge message ACK from the requesting terminal TEA. Thus, if the exchange EX1 detects an overload condition while it is attempting to establish an internal connection in the communications network KN1, it sends an overload message to the requesting subscriber by means of said peripheral components. The connection via an alternative path of the communications network KN2 will only be established after an acknowledge message is received from the requesting subscriber.

Figure 2:
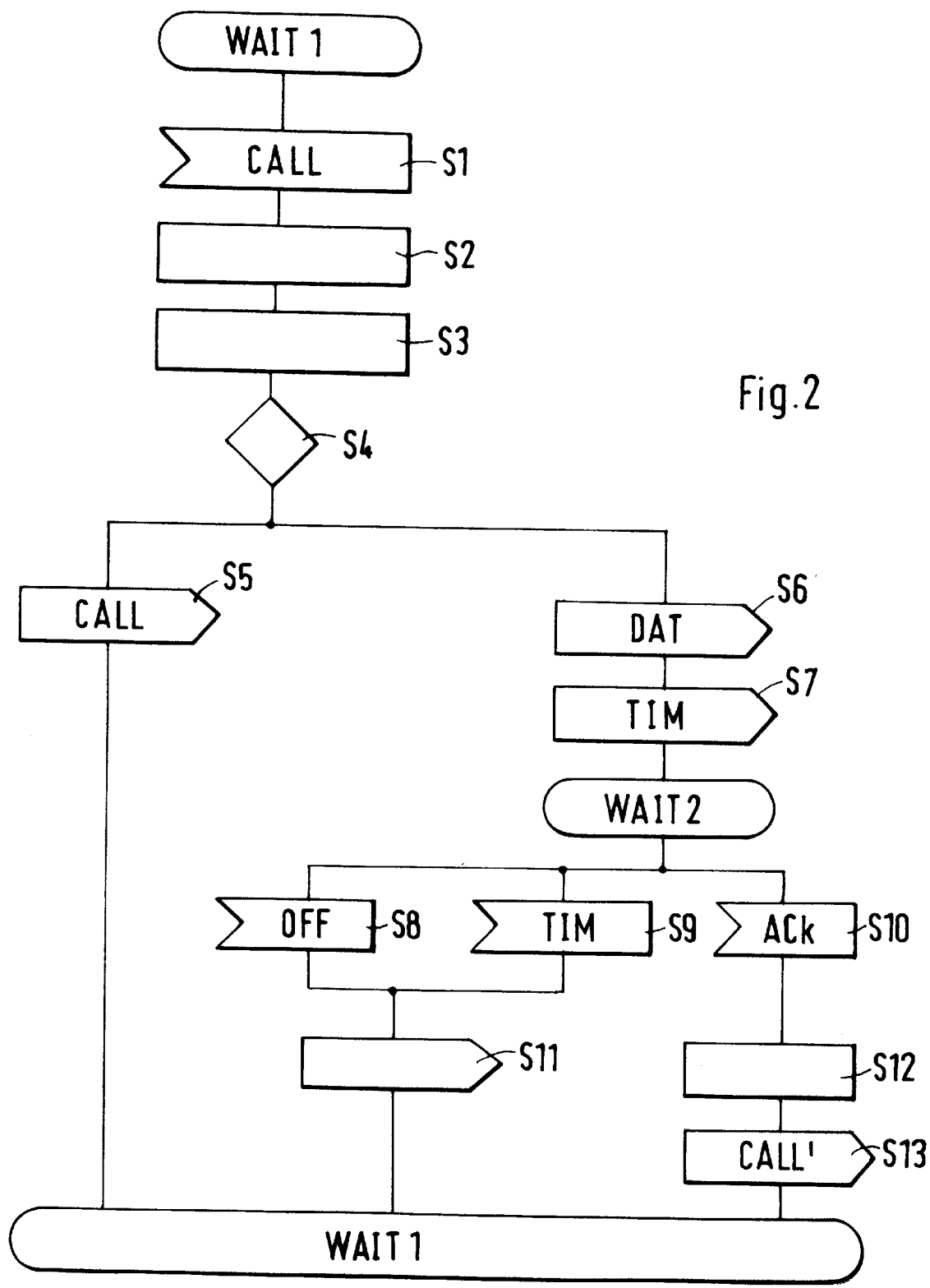
FIG. 2 is a flow diagram of the establishment of a connection according to the invention for the communications network in FIG. 1.

The peripheral components may be incorporated in the exchange EX1, and the above-mentioned means for transmitting messages to and receiving messages from the requesting terminal TEA may include an interface comprising separate transmitting and receiving means or a single transceiver. Among the several peripheral components PH may be included signal processing means which can constitute the means for receiving a call request from the requesting terminal, and may be further constituted by the above-mentioned control unit for determining whether sufficient capacity is available in the first communications network. Such a signal processing means is well known in the art and may include a microprocessor in conjunction with various devices, including memory devices, for storing a series of instructions for carrying out instructions such as illustrated in FIG. 2. Such a signal processor typically includes a central processing unit, a random access memory, a read-only memory, a clock, an input/output device, all interconnected by data, address and control buses, as is well known in the art and which is unnecessary to show in detail. Alternatively, the peripheral components PH can be constituted by equivalent discrete components.

In the case of an overload it is advantageous that the exchange EX1 controls the establishment of a requested connection between a terminal connected to the exchange and another terminal of the communications network KN1. In the case of an overload it is however also possible for the exchange EX1 to control the establishment of connections between a terminal connected to the exchange and a terminal of another communications network.

If a corresponding call request is rerouted to the exchange EX1, it is also possible for the exchange to control the establishment of connections between any terminals of any communications networks.

To fulfill the applicable functions of the method of the invention for establishing connections, in addition to the usual means for receiving a call request, the exchange EX1 has an added control unit which is used to determine the available capacity for a call request in the communications network KN1, as well as to control the establishment and the selection of alternative connections.

This control unit is formed of control programs which run on the usual hardware and software control platform of the exchange EX1. The configuration of these programs is specified by the sequence of the method for establishing connections described in detail below.

It is also possible for further or all exchanges of the communications network KN1 to be configured like exchange EX1.

The following explains the detailed sequence of the method of establishing connections in case of an overload as illustrated in FIG. 2.

FIG. 2 is a flow diagram which describes the function of the additional control unit of exchange EX1. The flow diagram depicts two conditions WAIT1 and WAIT2 and 13 steps S1 to S13. The condition WAIT1 represents a stand-by condition in which the control unit waits for the arrival of a call request.

Subscriber A now dials subscriber B. Terminal TEA which is assigned to him transmits a call request CALL to the exchange EX1 specifying terminal TEB as the called terminal. In step S1 the control unit recognizes the arrival of the call request CALL and initiates step S2.

In step S2 the control unit determines or verifies by means of the call number entered with the call request CALL whether a connection must be established to a terminal of the communications network KN1, or to a terminal of the other communications networks KN2 and KN3. If it is an internal call request, it goes on to step S3.

In step S3 the exchange EX1 checks whether sufficient capacity is available in communications network KN1 to establish the requested connection in communications network KN1. To that end it verifies the state of occupancy of the groups of transverse lines used to establish the connection. If the state of occupancy of the groups of transverse lines does not permit the establishment of the requested connections, the control unit decides in step S4 to go on to step S6. Otherwise it goes on to step S5.

It is also possible for the control unit EX1 to fully test the complete establishment of a connection between exchanges EX1 and EX2 for several possible connection links, before it arrives at the decision of step S4.

If the call request CALL is not addressed to a terminal of communications network KN1, the test of step S3 is not performed and the call request is rerouted via the respective network access to the corresponding requested communications network.

In step S5 the call request CALL is routed further via the respective group of transverse lines of the requested connection to the exchange EX1 in communications network KN1 which has sufficient capacity available to establish the requested connection. After that the control unit returns to the stand-by condition WAIT1. Routing the call request further then internally establishes the requested connection between the terminal TEA and TEB via the connection links of the communications network KN1.

In step S6 an overload message DAT is sent to terminal TEA. The overload message (DAT) is transmitted by the peripheral components PH as a voice message via a user information channel established between the terminal TEA and the exchange EX1.

It is however also possible for the overload message DAT to be displayed in text form in terminal TEA. This display text is transmitted for example via the signalling channel (D channel in ISDN), or by means of a modulation procedure via the user information channel.

The information or text sent to the subscriber is for example "Overload ?" or "Path busy".

A timer TIM is started in step S7. From step S7 the process then goes to the stand-by condition WAIT2.

If the subscriber A hangs up and a corresponding signalling message OFF is received, or if the time set in timer TIM runs out, the process goes from the stand-by condition WAIT2 in step S8 or S9 to step S11. If the terminal TEA receives an acknowledge message ACK, the process goes from the stand-by condition WAIT2 in step S10 to step S12.

The acknowledge message ACK is a command spoken by subscriber A, which is transmitted via the user information channel established between the terminal TEA and the exchange EX1. This command is evaluated by a voice recognition device which is integrated in the peripheral components, and is then routed further to the control unit.

It is also possible for the acknowledge message ACK to be released by activating a predetermined key on terminal TEA. The acknowledge message ACK could for example be a special signalling message transmitted via the signalling channel, or a signalling sequence in the user information channel, for example a multi-frequency dial tone.

The connection between terminal TEA and the exchange EX1 is released in step S11. The control unit then goes into the stand-by condition WAIT.

After step S11 it is also possible for the control unit to enter the call request CALL into a list before it goes into the stand-by condition WAIT1. In a second process the control unit would then check at regular intervals each of these call requests which had been entered into the list, to see whether sufficient capacity is available in the communications network KN2 to establish the requested connection. If this is the case, a release message is transmitted to the subscriber who issued the respective call request. This release message is transmitted to this subscriber by means of a voice message, for example via a user information channel to be established. The subscriber can then try once more to establish a corresponding connection, by again signalling a call with the call request to the exchange EX1. After the release message has been sent, it is also possible for the connection in the communications network KN1 to be automatically established when the subscriber sends an acknowledge message.

An alternative connection link via another communications network KN2 or KN3 is determined in step S12. To that end it is particularly necessary for the exchange EX1 to have available the corresponding data about accesses to the communications network NET1 and the possible connecting networks NET2 and NET3 between these network accesses. Depending on the selected alternative connection link, the private call number of subscriber B, i.e. the call number at which subscriber B can be reached in accordance with the numbering plan of the communications network KN1, is converted into a public call number of subscriber B, i.e. a call number whereby the subscriber can be reached via the communications network KN2.

In step S13 a changed call request CALL' with the converted call number is routed further to the selected communications network, in this instance the communications network KN2. Subsequently an alternative connection is established between the terminal TEA and TEB via the communications network KN2. The control unit then goes into the stand-by condition WAIT1.

A second configuration example now explains how the method of the invention is carried out to establish a connection for an overload situation in a communications network according to the invention, which contains a service computer according to the invention. The communications environment of the second configuration example is also structured as in FIG. 1. The only difference with respect to the first configuration example is that the additional control unit is not located in the exchange EX1 but in a service computer facility provided by the service computer of the invention, which is connected to the exchange EX1. In this case the exchange EX1 forms a service switching point (SSP) which communicates with the service control point (SCP) in accordance with the IN concept (IN=Intelligent Network). In this case it is also possible for the service control point to be connected to further exchanges EX and EX2 of communications network KN1, which also have such a service exchange function available.

The additional control unit of exchange EX1 according to FIGS. 1 and 2 is thereby integrated in the service computer and in the case of an overload controls the establishment of the connection for the exchange EX1, or for call requests arriving in several exchanges of the communications network KN1.

It is also possible for such a service control point to be connected to exchanges of different communications networks, thereby controlling the method of establishing connections in accordance with the invention for several communications networks.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. Method of establishing a connection wherein a requesting terminal (TEA) signals a call request (CALL) to a control unit of a first communications network (KN1), and wherein the control unit determines whether sufficient capacity is available in the first communications network (KN1) for establishing the connection requested by the call request, characterized in that in an absence of sufficient capacity, the control unit sends an overload message (DAT) to the requesting terminal (TEA), and initiates an alternative establishment of the requested connection through another, second communications network only upon reception of an acknowledge message (ACK) from the requesting terminal (TEA).

2. A method as claimed in claim 1, characterized in that the call request (CALL) is signaled by the requesting terminal (TEA) of the first communications network (KN1).

3. A method as claimed in claim 1, characterized in that the call request (CALL) requests an establishment of a connection to a requested terminal (TEB) of the first communications network (KN1).

4. A method as claimed in claim 1, characterized in that in the absence of sufficient capacity, a release message is sent from the control unit to the requesting terminal when sufficient capacity in the communications network is determined again.

5. A method as claimed in claim 4, characterized in that the establishment of the requested connection is initiated by the control unit upon receipt of an acknowledge message sent by the requesting terminal in response to the release message from the control unit.

6. Exchange (EX1) of a first communications network (KN1), comprising means for transmitting messages to and receiving messages including a call request (CALL) from a requesting terminal (TEA), and a control unit for determining whether sufficient capacity is available in the first communications network (KN1) for establishing a requested connection in response to the call request (CALL), characterized in that the control unit initiates a transmission of an overload message (DAT) to the requesting terminal (TEA) if insufficient capacity is determined, and initiates an alternative establishment of the requested connection through another, second communications network (KN2) only upon reception of an acknowledge message (ACK) from the requesting terminal (TEA).

7. Service computer for a first communications network or for two or more communications networks, comprising means for transmitting messages to and receiving messages including a call request from a requesting terminal, and a control unit for determining whether sufficient capacity is available in the first communications network or in a first of the two or more communications networks for establishing a requested connection in response to the call request, characterized in that the control unit initiates a transmission of an overload message to the requesting terminal if insufficient capacity is determined, and initiates an alternative establishment of the requested connection through another, second communications network only upon reception of an acknowledge message from the requesting terminal.

8. A service computer as claimed in claim 7, characterized in that the service computer is a service control unit connected to at least one service switching point of the first communications network or of each of the two or more communications networks.

9. Communications network (KN1) for establishing a connection in response to a requesting terminal of the communications network signaling a call request to a control unit of the communications network for determining whether sufficient capacity is available in the communications network for establishing the connection requested by the call request, wherein in an absence of sufficient capacity, the control unit sends an overload message to the requesting terminal and initiates an alternative establishment of the requested connection through another communications network only upon receipt of an acknowledge message from the requesting terminal.

* * * * *

UNITED STATES PATENT AND TRADEMARK OFFICE
CERTIFICATE OF CORRECTION

PATENT NO : 5,926,536
DATED : July 20, 1999
INVENTOR(S): H. Orlamünder et al

It is certified that error appears in the above-identified patent and that said Letters Patent is hereby corrected as shown below:

On the title page:

After INID. [22], please add a new INID [30], as follows:

--[30]    Foreign Application Priority Data

May 30, 1996  [DE]  Germany ........ 196 21 718.0--.

Signed and Sealed this

Twenty-fifth Day of January, 2000

Attest:

Attesting Officer

*Acting Commissioner of Patents and Trademarks*